United States Patent [19]

Güttinger

[11] Patent Number: 4,709,571
[45] Date of Patent: * Dec. 1, 1987

[54] METHOD OF OPERATING A CONTROLLED DEFLECTION ROLL AND A ROLLING MILL EQUIPPED WITH AT LEAST ONE CONTROLLED DEFLECTION ROLL

[75] Inventor: Heinz Güttinger, Schaffhausen, Switzerland

[73] Assignee: Sulzer-Escher Wyss AG, Winterthur, Switzerland

[*] Notice: The portion of the term of this patent subsequent to Nov. 4, 2003 has been disclaimed.

[21] Appl. No.: 830,766

[22] Filed: Feb. 19, 1986

Related U.S. Application Data

[62] Division of Ser. No. 408,694, Aug. 16, 1982, Pat. No. 4,620,348.

[30] Foreign Application Priority Data

Sep. 21, 1981 [CH] Switzerland .................. 6072/81

[51] Int. Cl.4 ............................................. B21B 31/32
[52] U.S. Cl. .................... 72/366; 29/116 AD; 72/20; 72/21; 72/245; 100/162 B
[58] Field of Search ............ 72/245, 243, 20, 21, 72/365, 366; 29/116 AD, 113 AD, 116 R, 113 R; 100/162 B

[56] References Cited

U.S. PATENT DOCUMENTS

| | | | |
|---|---|---|---|
| 2,691,339 | 10/1954 | Edwards | 100/170 |
| 4,069,569 | 1/1978 | Meckel et al. | 29/116 AD |
| 4,213,232 | 7/1980 | Biondetti et al. | 29/116 AD |
| 4,307,501 | 12/1981 | Ahrweiler | 29/116 AD X |
| 4,399,747 | 8/1983 | Schiel et al. | 29/116 AD X |
| 4,414,890 | 11/1983 | Schiel et al. | 100/162 B |

*Primary Examiner*—Robert L. Spruill
*Assistant Examiner*—Steve Katz
*Attorney, Agent, or Firm*—Werner W. Kleeman

[57] ABSTRACT

A method of operating a controlled deflection roll having a stationary roll support or beam and a roll shell or jacket rotatable about the stationary roll support. The rotatable roll shell is supported in relation to the stationary roll support by means of hydrostatic pressure elements. The roll shell is displaceably guided in guides in relation to the stationary roll support for movement in a press or pressure plane. Between the rotatable roll shell and the stationary roll support, supporting or carrier members are operated and regulated for taking-up the inherent weight of the rotatable roll shell within the range of mobility of the rotatable roll shell in relation to the stationary roll support or beam.

17 Claims, 9 Drawing Figures

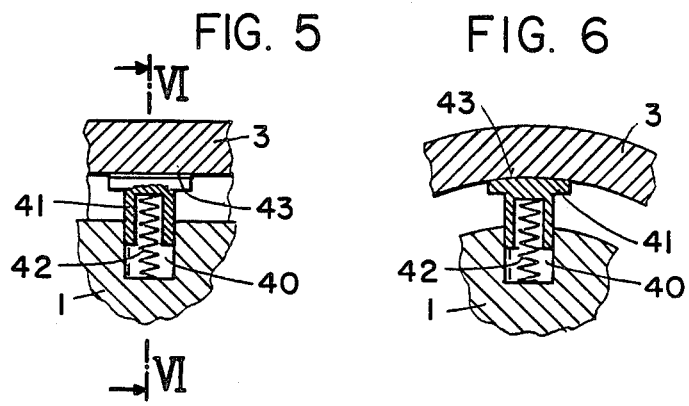
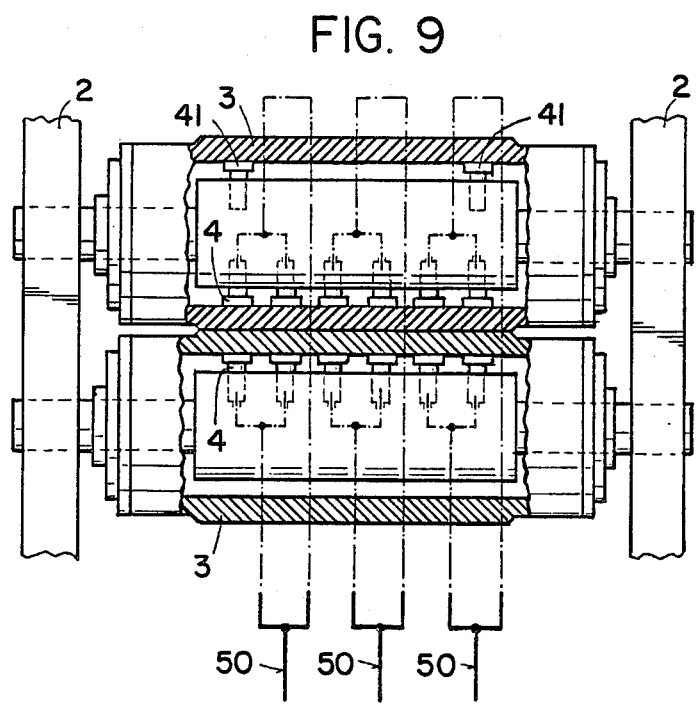

METHOD OF OPERATING A CONTROLLED DEFLECTION ROLL AND A ROLLING MILL EQUIPPED WITH AT LEAST ONE CONTROLLED DEFLECTION ROLL

CROSS REFERENCE TO RELATED APPLICATION

This application is a divisional application of my commonly assigned, co-pending U.S. application Ser. No. 06/408,694, filed Aug. 16, 1982, now U.S. Pat. No. 4,620,348 and entitled "CONTROLLED DEFLECTION ROLL".

BACKGROUND OF THE INVENTION

The present invention relates to a new and improved method of operating a controlled deflection roll —also referred to in the art as a roll with bending or sag compensation—containing a stationary roll support or beam and a roll shell rotatable about said stationary roll support, wherein the rotatable roll shell is supported in relation to the stationary roll support by means of support or pressure elements and can be displaced relative to the stationary roll support in a press or pressure plane within a predetermined mobility range.

The present invention also relates to a new and improved method of operating a rolling mill incorporating one or more controlled deflection rolls of the previously mentioned type.

Such type of controlled deflection roll is known to the art, for instance, from U.S. Pat. No. 3,885,283, granted May 27, 1975. The support or pressure elements which are used with such prior art construction of controlled deflection roll are known from U.S. Pat. No. 3,802,044, granted Apr. 9, 1974. However, it is to be understood that also many other different types of support or pressure elements can be beneficially employed with such type of controlled deflection roll for performing the inventive method.

There have also been already proposed and constructed rolling mills or equipment, for instance calenders, wherein two such type of controlled deflection rolls press towards one another, and between such controlled deflection rolls there can be located further standard rolls. Such type of rolling mills manifest themselves by a heretofore hardly attainable uniformity of the pressing force over their width, even if, however, such is realized at the expense of providing for the equipment a relatively complicated regulation system since it is necessary to compensate the inherent weight throughout the entire length of the roll.

SUMMARY OF THE INVENTION

Therefore, with the foregoing in mind it is a primary object of the present invention to provide a new and improved method of operating a controlled deflection roll which appreciably simplifies the regulation of rolling mills in that, during the regulation of the pressing forces of mutually oppositely effective pressure or support elements it is no longer necessary to take into account the inherent weight of the roll shell and the therewith associated movable parts.

Another and more specific object of the present invention is directed to a new and improved method of operating a controlled deflection roll which is relatively simple in concept, extremely economical to perform, highly reliable in execution, not readily subject malfunction, requires a minimum of attention, and can be beneficially used in rolling mills or similar equipment without the need for complicated regulation systems.

Now in order to implement these and still further objects of the invention, which will become more readily apparent as the description proceeds, the method of the present invention is manifested by the features that supporting or carrier members interposed between the stationary roll support or beam and the rotatable roll shell are operated and regulated for taking-up the inherent weight of the roll shell and possible parts moving in conjunction with the roll shell throughout the mobility region of the roll shell in relation to the stationary roll support.

In other words, the method of the present invention is manifested by the features that it comprises the steps of operating supporting or carrier members for compensating the weight of a roll shell of the controlled deflection roll and the weight of components carried by the roll shell within a mobility range of the roll shell, regulating the supporting or carrier members such that said weights are substantially exactly compensated and operating and regulating pressure elements for providing a predeterminate degree and distribution of pressing force across the width of the controlled deflection roll independently of said weights. The supporting or carrier members act upwardly, while the pressure elements may act either upwardly or downwardly according to the particular arrangement or location of the controlled deflection roll.

With such method of operation of a controlled deflection roll, the weight of the roll shell and of the possible parts effective by the action of their weight upon the roll shell, for instance the pressure elements, is taken-up by the supporting or carrier members, so that the regulation of the pressure elements in a rolling mill or calender only has to be performed in relation to the pressing force, and specifically, in opposite sense with two rolls mutually pressing against one another with pairs of coacting pressure elements.

According to an extremely simple method of regulating the press roll, the supporting or carrier members can be springs or can contain springs. These springs can be formed, for instance, from a suitable metal. However, they also can be fluid springs, such as gas and/or liquid springs.

In the case of a method of operation which is suitable for fulfilling greater requirements, there can be employed gas or liquid springs equipped with positioning feelers and regulators actuatable by such positioning feelers for regulating the supporting force.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 5 is a partial sectional view, corresponding to the showing of FIG. 1, of a different embodiment of the supporting or carrier member equipped with springs;

FIG. 6 is a cross-sectional view of the arrangement of FIG. 5, taken substantially along the section line VI—VI thereof;

FIG. 9 is a schematic illustration of the circuitry for the pressure lines of the pressure or support elements of a rolling mill containing controlled deflection rolls operated according to the invention.

DETAILED DESCRIPTION OF THE PREFERRED EMBODIMENTS

Figure 1:
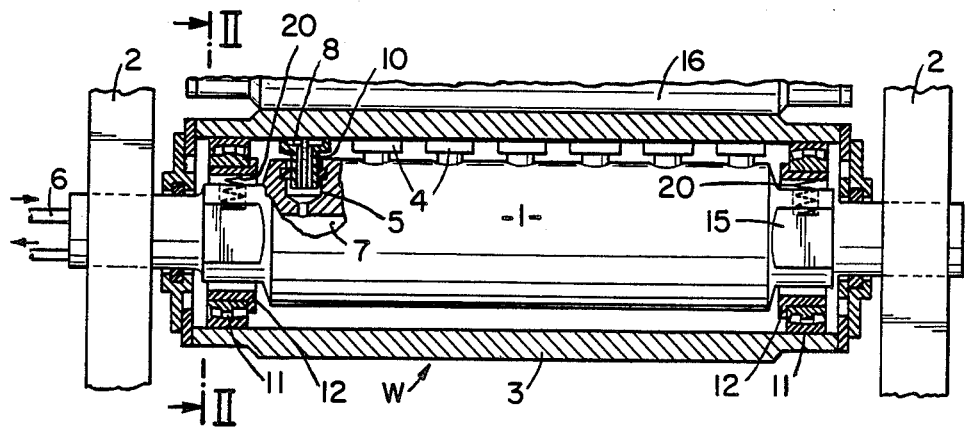
FIG. 1 is a longitudinal sectional view through a controlled deflection roll constructed for practising the inventive method.

Describing now the drawings, it is to be understood that only enough of the construction of the various embodiments of controlled deflection rolls has been depicted in the drawings as will enable those skilled in this art to readily understand the underlying principles and concepts of the present development, while simplifying the illustration. Turning attention now specifically to FIG. 1 there is shown therein by way of example and not limitation, a controlled deflection roll W for performing the method of the invention which is here assumed to be of the type known from the aforementioned U.S. Pat. Nos. 3,885,283 and 3,802,044, to which reference may be readily had. This controlled deflection roll W contains a stationary roll support or beam 1, the ends of which are mounted and secured against rotation in side elements or plates 2 of a here not further illustrated conventional frame arrangement or roll stand. A roll shell or jacket 3 is mounted in appropriate known fashion to be rotatable about the stationary roll support or beam 1. This rotatable roll shell 3 is supported upon hydrostatic pressure or support elements 4. As clearly described in the aforementioned U.S. Pat. No. 3,802,044, the pressure elements 4 are sealingly guided, however so as to be inclinable, within substantially cylindrical bores 5 and are subjected to the action of a suitable hydraulic pressurized fluid medium, typically pressurized oil, which is infed by a line or conduit 6 into an internal bore or passage 7 of the stationary roll support or beam 1. As also explained in this U.S. Pat. No. 3,802,044 there is provided, in addition to the hydrostatic support of the rotatable roll shell or jacket 3 upon the piston-like pressure elements 4, also a hydrostatic lubrication between the running or contact surfaces of the pressure elements 4 and the inner surface of the roll shell 3. For this purpose the running or contact surfaces of the pressure or support elements 4 are provided with hydrostatic bearing pockets 8 or equivalent structure which are flow connected by throttle bores 10 with the pressure space or chamber of the related cylinder 5. Here also as to this mode of operation, reference may be again made to such U.S. Pat. No. 3,802,044.

On the other hand, as is known from the likewise previously mentioned U.S. Pat. No. 3,885,283, suitable anti-friction bearings, such as the roller bearings 11 are arranged at the opposed ends of the rotatable roll shell or jacket 3. Guide bushings or elements 12 are mounted in such roller bearings 11. As particularly evident by inspecting FIG. 2, each guide bushing or element 12 is provided with an elongate opening or slot 13 which is bounded by substantially flat side walls or surfaces 14. The stationary roll support or beam 1, in turn, is provided with substantially parallel flat guide surfaces 15 which are guided with slight play between the guide walls or surfaces 14 of the related guide bushing or element 12. As also will be readily evident by referring to FIG. 2, the rotatable roll shell or jacket 3 is displaceable in this manner in relation to the stationary roll support or beam 1 in the press or pressure plane E within a mobility range or region which results from the difference of the respective dimensions B and A of the opening 13 in the guide element 12 and the stationary roll support 1 at the same location. As apparent from the illustration of FIGS. 1 and 2 the controlled deflection roll W cooperates with a further roll 16.

Figure 2:
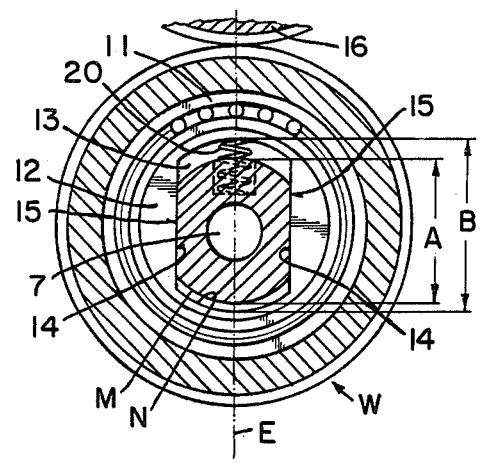
FIG. 2 is a cross-sectional view of the controlled deflection roll depicted in FIG. 1, taken substantially along the section line II—II thereof.

In the controlled deflection roll W according to the illustration of FIGS. 1 and 2 there is arranged between the guide element or bushing 12 and the stationary roll support 1 a spring member 20 which serves as a supporting or carrier member. The spring characteristic of the spring member 20 is chosen such that within the aforementioned mobility range it takes-up the weight of the rotatable roll shell 3 and parts which are possibly movable along therewith. Such type of movable parts can be constituted by parts or elements such as, for instance, the roller bearings 11 which are fixedly connected with the rotatable roll shell 3, but however also can consist of the hydraulic pistons or pressure elements 4 if, for instance, such are downwardly directed in the press or pressure plane E. Finally, other parts can also be supported by the rotatable roll shell 3, such as for instance the coacting roll 16. The expression "within the mobility range or region" means, in this connection, that with unactuated, forceless pressure or support elements 4 the rotatable roll shell 3 is floatingly supported upon the spring members or springs 20 in such a manner that the end surfaces M and N of the opening 13 at the guide element 12 and the stationary roll support 1 do not contact one another.

The arrangement of FIGS. 1 and 2 is operated and regulated in the following manner:

The spring members 20 serving as the supporting or carrier members are designed to just compensate the weight of the roll shell 3 and any components carried by the roll shell, such as the outer bearing race 11, the weight of a possibly unsupported intermediate work roll or other controlled deflection roll, the weight of pressure elements 4 arranged to act downwardly as indicated in the upper half of FIG. 9 et cetera. It will be appreciated that controlled deflection rolls located above and below the nip of the roll stand will require spring members 20 having different spring constants, due to the additional weight of the pressure elements 4 borne by the roll shell of a controlled deflection roll located above the roll nip in comparison to one located below the roll nip. In a controlled deflection roll located beneath the roll nip, the weight of the pressure elements 4 is borne by the roll support or beam 1. If necessary, the action of the spring members 20 can be regulated either by selecting alternate spring members 20 having a slightly different spring constant or by inserting or removing shims between the spring member 20 and its corresponding socket 40 in the roll support or beam 1.

In this manner, the weight of the roll shell or of each roll shell of a pair of roll shells plus the weight of any components supported by the roll shell or roll shells is exactly compensated by the spring members 20 acting as supporting or carrier members. This relieves the pressure elements 4 and their regulating system of the necessity of taking into account the different values and senses of the weight of the roll shells and their associated components, as well as the difference in sense relative to the mutually opposing pressing forces. This considerably simplifies the regulation of the pressure elements 4, practically reducing it to a matter of directly producing the desired pressing force or the desired profile of pressing force.

Figure 3:
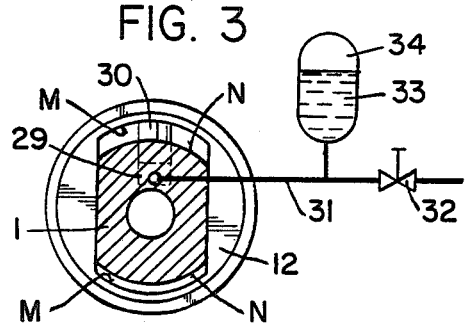
FIG. 3 is a variant of the controlled deflection roll depicted in FIG. 2 and containing a gas-liquid spring.
Figure 4:
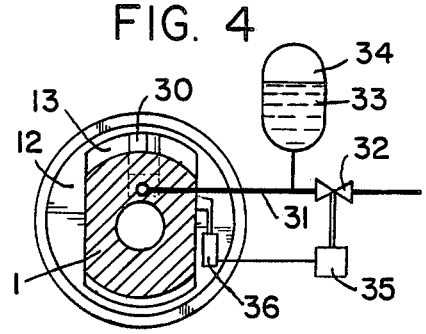
FIG. 4 illustrates an exemplary embodiment of a spring of the type shown in FIG. 3 containing a regulator for the regulation of the supporting force.

FIGS. 3 and 4 respectively illustrate constructional embodiments in sectional view, corresponding to the illustration of the arrangement of FIG. 2, wherein, however, here each metallic spring 20 is replaced by a related hydraulic-pneumatic spring arrangement i.e. a fluid spring.

Thus, with the embodiment of FIGS. 3 and 4 substantially cylindrical bores or cylinders 29 are formed in the stationary roll support or beam 1. In the cylindrical bores 29 there are sealingly guided piston members or pistons 30 defining supporting or carrier members and which bear against the upper end surface M of the related guide bushing or element 12. The cylindrical bore 29 is connected by means of a line or conduit 31 with a shut-off element 32 at a not particularly illustrated source of hydraulic pressurized fluid medium. Connected with the line or conduit 31 is a pressure container or reservoir 33 which, in the illustrated exemplary embodiment, contains a gas chamber or space 34.

The apparatus illustrated in FIG. 3 functions in the same manner as the springs 20 of the controlled deflection roll discussed above in conjunction with the embodiment of FIGS. 1 and 2, with the exception however that the spring characteristic can be set or regulated by the selection of the hydraulic pressure in the line or conduit 31 and the size of the volume of the gas space 34. Under circumstances, this gas space 34 can be completely omitted, so that there is only utilized the elasticity of the liquid located in the parts 31 and 33.

The operation of the embodiment of FIG. 4 corresponds essentially to that of FIG. 3, so that as a matter of convenience there have been generally used the same reference characters to denote the same or analogous components. With the embodiment of FIG. 4, however, the shut-off element 32 is provided with a servo motor 35 which is actuated by a positioning feeler or sensor 36 which is secured at the guide element or bushing 12 and at the stationary roll support or beam 1. The positioning feeler 36 and the servo motor 35 ensure that the stationary roll support or beam 1 is at least approximately always located in the same position within the opening 13 of the related guide element or bushing 12.

The operation and regulation of the embodiments of FIGS. 3 and 4 is as follows:

Each piston or carrier member 30 guided in its related cylinder or bore 29 is subjected to a fluid or hydraulic pressure through the conduit 31. This hydraulic pressure is related to the diameter of the related piston or carrier member 30 such that there is produced a force just adequate to compensate the weight of the roll shell and any components borne by the roll shell as discussed in relation to the embodiment of FIG. 1. A fine regulation of the compensation of these weights can be achieved by varying the hydraulic pressure, for instance by means of the valve 32. Sudden or unusual loading of the roll shell can be accommodated by the elastic or resilient action of the gas chamber 34 in the reservoir 33. In the embodiment of FIG. 4, the height of the roll shell and therefore the dimension or location or both of the roll nip within the rolling mill can be regulated by the servo motor 35 in cooperation with the positioning feeler 36. By adjusting the relation between the positioning feeler 36 and the servo motor 35, the nominal position to which the roll shell is regulated can be altered.

FIGS. 5 and 6 illustrate in conjunction with FIG. 9 a further possibility of operating and regulating supporting or carrier members for taking-up the inherent weight of the roll shell and possibly further parts. According to these FIGS. 5, 6 and 9 there are formed bores 40 or equivalent passages in the stationary roll support or beam 1. Substantially piston-like supporting or carrier members 41 are guided in these bores 40 and are supported in such bores upon springs 42. The supporting or carrier members 41 contain running or travel surfaces 43 which slide upon the inner surface of the roll shell or jacket 3. In this case the lubrication is accomplished hydrodynamically, which is rendered possible by virtue of the fact that the supporting forces of the supporting or carrier members 41 are appreciably smaller than the pressing forces of the pressure elements 4.

From the illustration of FIG. 9 it will be apparent that the supporting or carrier members 41 can be arranged at the end regions of the related rotatable roll shell or jacket 3. However, it is to be also understood that a number of supporting or carrier members 41 can be distributively arranged throughout the length of the rotatable roll shell 3. The supporting or carrier members 41 also can be combined, for instance, with the support springs 20 or the support arrangements shown in FIGS. 5 and 6.

The operation and regulation of the embodiment illustrated in FIGS. 5, 6 and 9 can be effected in a manner analogous to that of any of the previously described embodiments or even as a combination of the previously described embodiments. For instance, the carrier member 41 may be operated and regulated by the force of a mechanical spring such as the spring 42 or may be hydraulically operated and regulated. A particularly advantageous embodiment results when the spring 42 is used in conjunction with hydraulic regulation. In this case, the basic supporting force of the carrier member 41 can be provided by the spring 42, while the remainder is provided by a regulatable hydraulic system. This permits a particularly fine and convenient regulation of the supporting force.

Figure 7:
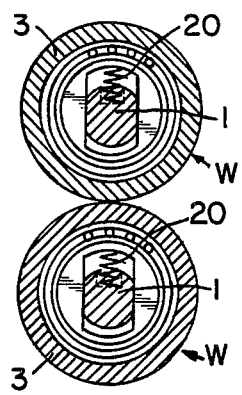
FIGS. 7 and 8 illustrate two respectively different possibilities of employing the controlled deflection roll in a rolling mill or device, the showing being in sectional view corresponding to the illustration of FIG. 2.
Figure 8:
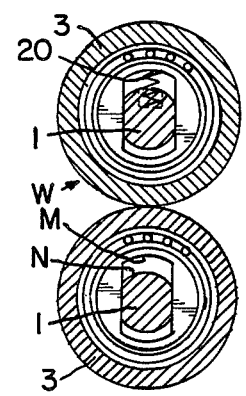

FIGS. 7 and 8 depict possibilities of operating the inventive controlled deflection roll W in rolling mills containing two rolls according to the aforementioned U.S. Pat. Nos. 3,885,283 and 3,802,044.

Thus, according to FIG. 7 there are operated two inventively constructed controlled deflection rolls W, the springs 20 of which in each case support the inherent weight of the related rotatable roll shell 3.

According to the arrangement of FIG. 8 only the upper roll is operated as a controlled deflection roll W according to the teachings of the invention, wherein the weight of the rotatable roll shell 3 and, in this case, also the weight of the downwardly directed support or pressure elements 4 are carried by the springs or spring members 20. The lower roll is a standard roll constructed and operated according to the teachings of the aforementioned United States Patents. If the pressure or support elements 4 of such lower roll are not actuated, then the rotatable roll shell 3 is lowered upon the stationary roll support or beam 1 in such a manner that the aforementioned surfaces M and N of the guide element or bushing 12 and the stationary roll support 1 come to bear against one another.

Finally, FIG. 9 shows in conjunction with a simplified schematic illustration the connection of the pressure elements 4 serving for generating and regulating the press or pressure force, with an arrangement of the type depicted in FIGS. 3 or 4. As will be apparent from such FIG. 9, the pressure elements 4 of both rolls, the upper roll and equally the lower roll, are connected in each case with the same pressure line or conduit 50, and specifically in a manner such that the upper pressure or support elements 4 and the lower pressure or support elements 4 exert the same press or pressure forces. There are thus not needed any particular regulation devices for taking into account the inherent weight of the rotatable roll shell and the movable parts, since such inherent weight is taken-up by the supporting or carrier members, in this case the supporting or carrier members 41.

In FIG. 9 there have been depicted three pressure lines or conduits 50 for the purpose of possibly forming pressure zones, and as to such three pressure lines 50 each can contain a different pressure. There can be provided a larger number of such pressure lines 50 or only a single such pressure line, at which then there are connected all of the pressure elements 4. Also, during the formation of independently regulatable pressure zones, i.e. in the case of a plurality of pressure lines 50, each zone may have more than only two pressure elements 4, which for purposes of simplifying the illustration of the drawing of FIG. 9 have only been shown as containing two such pressure elements 4 for each pressure zone.

The pressure elements of the type disclosed in U.S. Pat. No. 3,802,044 have only been illustrated herein as an exemplary construction of the pressure or support elements and not by way of limitation. Therefore, it should be clearly understood that also other constructions of pressure elements can be provided for forming the press or pressing force, provided that they allow for the requisite displaceability of the rotatable roll shell 3 in relation to the stationary roll support 1 in the press or pressure plane E.

For reasons of simplicity in illustration the springs 20 have been illustrated as helical springs. Here also it should be expressly understood that in lieu thereof there also can be advantageously employed other types of springs, such as plate springs and so forth. The supporting or carrier members also can be arranged externally of the rotatable roll shell. What is important is that they are interposed between the stationary roll support or beam and the rotatable roll shell or jacket.

While there are shown and described present preferred embodiments of the invention, it is to be distinctly understood that the invention is not limited thereto, but may be otherwise variously embodied and practiced within the scope of the following claims. Accordingly,

What I claim is:

1. A method of operating a controlled deflection roll, comprising the steps of:

operating carrier members for compensating the weight of a roll shell of the controlled deflection roll and the weight of components borne by said roll shell within a predetermined mobility range of said roll shell;

regulating said carrier members such that said weights are substantially exactly compensated; and operating and regulating pressure elements for providing a predetermined degree and distribution of pressing force across the width of the controlled deflection roll independently of said weights.

2. The method as defined in claim 1, wherein:

said carrier members acting upwardly for compensating said weights; and said pressure elements acting upwardly for providing said pressing force.

3. The method as defined in claim 1, wherein:

said carrier members act upwardly for compensating said weights; and said pressure elements acting downwardly for providing said pressing force.

4. The method as defined in claim 1, wherein:

said steps of operating and regulating said carrier members entail operating and regulating mechanical spring members.

5. The method as defined in claim 1, wherein:

said steps of operating and regulating said carrier members entail operating and regulating fluid spring members.

6. The method as defined in claim 5, wherein:

said step of regulating said carrier members entails sensing respective positions of said carrier members by means of position feelers and regulating said carrier members such that said weights are compensated with said roll shell in a predeterminate position.

7. A method of operating a rolling mill having at least one controlled deflection roll, comprising the steps of:

operating carrier members for compensating the weight of a roll shell of the at least one controlled deflection roll and the weight of components borne by said roll shell within a predetermined mobility range of said roll shell;

regulating said carrier members such that said weights are substantially exactly compensated; and operating and regulating pressure elements for providing a predetermined degree and distribution of pressing force across the width of the at least one controlled deflection roll independently of said weights.

8. The method as defined in claim 7, wherein:

said carrier members act upwardly for compensating said weights; and said pressure elements acting upwardly for providing said pressing force.

9. The method as defined in claim 7, wherein:

said carrier members acting upwardly for compensating said weights; and said pressure elements acting downwardly for providing said pressing force.

10. The method as defined in claim 7, wherein:

said steps of operating and regulating said carrier members entail operating and regulating mechanical spring members.

11. The method as defined in claim 7, wherein:

said steps of operating and regulating said carrier members entail operating and regulating fluid spring members.

12. The method as defined in claim 10, wherein:
said step of regulating said carrier members entails sensing respective positions of said carrier members by means of position feelers and regulating said carrier members such that said weights are compensated with said roll shell in a predeterminate position.

13. A method of operating a rolling mill having a pair of controlled deflection rolls, comprising the steps of:
operating carrier members for compensating the weight of a roll shell of each controlled deflection roll of said pair of controlled deflection rolls and the weight of components carried by said roll shells within a respective predetermined mobility range of each said roll shell;
regulating said carrier members such that said weights are substantially exactly compensated; and
operating and regulating pressure elements of each said controlled deflection roll for providing a predetermined degree and distribution of pressing force across the width of said pair of controlled deflection rolls independently of said weights.

14. The method as defined in claim 13, wherein:
said carrier members act upwardly for compensating said weights;
said pressure elements of a first controlled deflection roll of said pair of controlled deflection rolls acting upwardly for providing said pressing force; and
said pressure elements of a second controlled deflection roll of said pair of controlled deflection rolls acting downwardly for providing said pressing force.

15. The method as defined in claim 13, wherein:
said steps of operating and regulating said carrier members entail operating and regulating mechanical spring members.

16. The method as defined in claim 13, wherein:
said steps of operating and regulating carrier members entail operating and regulating fluid spring members.

17. The method as defined in claim 16, wherein:
said step of regulating said carrier members entails sensing respective positions of said carrier members by means of position feelers and regulating said carrier members such that said weights are compensated with each said roll shell in a predeterminate position.

* * * * *